United States Patent
Shafer et al.

[19]

[11] Patent Number: 6,044,184
[45] Date of Patent: Mar. 28, 2000

[54] INTEGRATED OPTICS CHIP WITH REDUCED THERMAL ERRORS DUE TO PYROELECTRIC EFFECTS

[75] Inventors: Kenneth W. Shafer, Thousand Oaks; Henry C. Abbink, Westlake Village; John P. Rahn, West Hills; Christine E. Geosling, Calabasas, all of Calif.; Gregory A. Zimmerman, Layton, Utah

[73] Assignee: Litton Systems Inc., Woodland Hills, Calif.

[21] Appl. No.: 09/123,955

[22] Filed: Jul. 28, 1998

Related U.S. Application Data

[60] Provisional application No. 60/080,260, Mar. 31, 1998.

[51] Int. Cl.[7] .................................................. G02B 6/12
[52] U.S. Cl. ................................ 385/14; 385/3; 385/4; 385/129; 385/131; 385/132
[58] Field of Search .................................. 385/14, 1–4, 7, 385/8, 11, 12, 13, 50, 130, 131, 132, 141; 156/629, 643; 219/121.69, 121.85

[56] References Cited

U.S. PATENT DOCUMENTS

| | | | |
|---|---|---|---|
| 5,046,808 | 9/1991 | Chang | 385/13 |
| 5,153,930 | 10/1992 | DuPuy et al. | 385/8 |
| 5,388,170 | 2/1995 | Heismann et al. | 385/4 |
| 5,393,371 | 2/1995 | Chang et al. | 156/629 |
| 5,442,719 | 8/1995 | Chang et al. | 385/3 |
| 5,661,830 | 8/1997 | Nishimoto | 385/40 |

OTHER PUBLICATIONS

A. Savage, Pyroelectricity and Spontaneous Polarization in LiNbO3 Jul. 1966, pp. 3071, 3072.
Naoki Mitsugi et al, Activation Energy for Dc–drift in X–cut LiNbO3 Optical Intensity Modulators, Eng. & Lab. Notes.
C. H. Blumer and W. K. Burnes, Pyroelectric effects in LiNbO3 channel–waveguide devices, Apr. 1986, Applied Physics Letters, vol. 48, No. 16, pp. 1036–1038.

*Primary Examiner*—Phan T. H. Palmer
*Attorney, Agent, or Firm*—James F. Kirk

[57] ABSTRACT

An integrated optics chip with improved performance when exposed to changing temperature is disclosed. The optic chip or integrated optics chip or MIOC has a top surface, a +Z face and −Z face. The integrated optics chip is formed from a crystal substrate having a high electro-optic coefficient such as Lithium Niobate. For the purpose of orienting the components to the optic chip to be described, the +Z crystal axis extends outward from the +Z face, the Z axis being the axis across which a pyroelectric effect is exhibited. The top surface is orthogonal to the Z axis. An input waveguide on the top surface receives an optical signal from an input port, passes the signal via a waveguide network, to an output waveguide coupling the waveguide network to an output port. A portion of the +Z and −Z faces are coated at least partially with a conductive coating. A conductive path couples the +Z and −Z faces to prevent a charge differential from developing between the +Z and −Z faces due to a change in temperature of the optic chip and the pyroelectric effect.

20 Claims, 4 Drawing Sheets

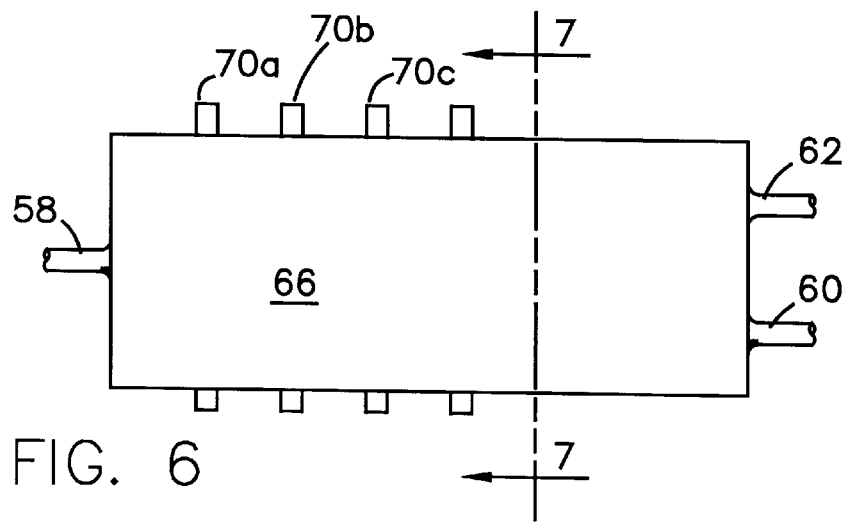
FIG. 6
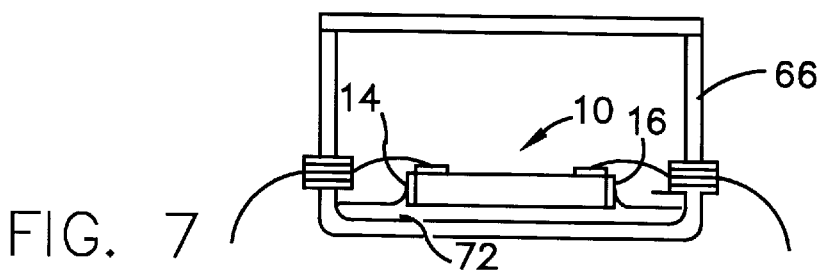
FIG. 7
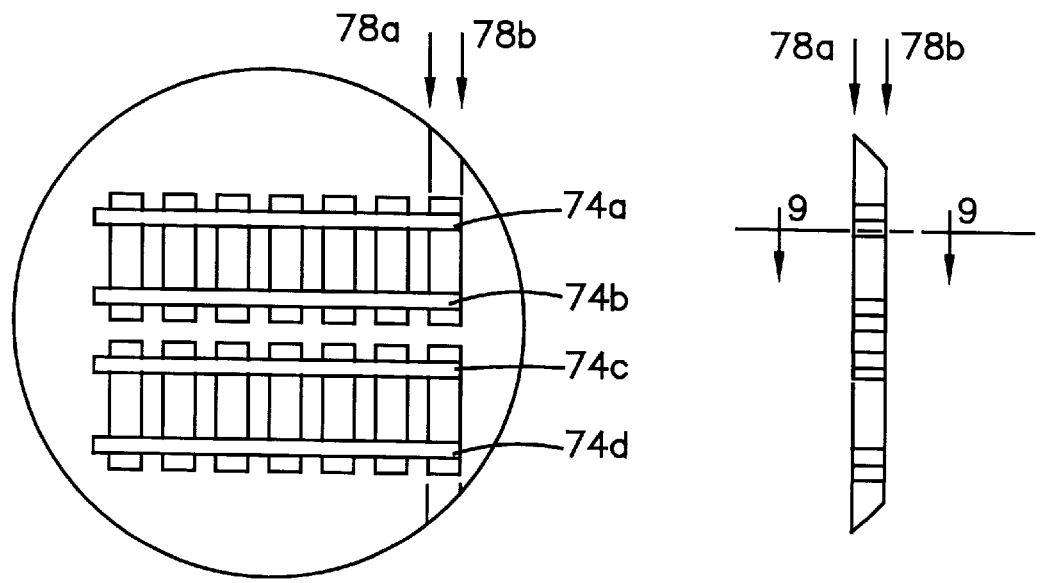
FIG. 8a
FIG. 8b

INTEGRATED OPTICS CHIP WITH REDUCED THERMAL ERRORS DUE TO PYROELECTRIC EFFECTS

This application formalizes and claims priority from Provisional Application 60/080,260 filed Mar. 31, 1998 for a "Method and Apparatus for the Reduction of Thermal Errors in Integrated Optics Chips Due to the Pyroelectric Effect" by Kenneth W. Shafer et al.

BACKGROUND OF THE INVENTION

FIELD OF INVENTION

The invention relates to the field of integrated optics chips or devices and more particularly to the field of multifunction integrated optics chips such as those having integrated optic circuits formed on Lithium Niobate ($LiNbO_3$) substrates. Integrated optics chips are designed to include waveguides and to perform functions such as "Y", "Y-Y", or Star spliters or couplers, WDM (Wavelength Dependent Couplers) and modulators. Multiple functions are incorporated on a single device eliminating losses and errors associated with individual interface optical coupling.

The devices are usually fabricated in large numbers on three to four inch wafers of Lithium Niobate ($LiNbO_3$) using conventional photomasks, vacuum deposition, chemical baths and etching techniques to form large numbers of identical components at low cost and with high reliability. MIOC's (Multifunction Integrated Optical Chips or Components) or circuits capable of performing many of the aforementioned functions are necessary for the fabrication of middle and high accuracy fiber optic gyros (FOGS) or rotation sensors that rely on the principle of Sagnac interferometers and possibly other interferometric fiber optic sensors such as hydrophones that rely on the principles of the Mach-Zehnder or Michaelson Interferometers requiring high stability.

While investigating the reason for a transient effect that resulted in signal saturation which was observed while performing temperature cycle tests on FOGs, the inventors observed an electrical discharge or arc at the base of a de-lidded, packaged MIOC. The test MIOC chip was made of Lithium Niobate ($LiNbO_3$) and was similar in size to the related art device shown in FIG. 1. The inventors related the discharge to a pyroelectric effect and calculated that a device of that width would generate voltages across the 2 mm width of the chip of above 100 volts per degree centigrade.

It was recognized that the pyroelectric effect observed might also be related to a FOG power hysteresis problem also under investigation in which a charge differential developed across the face of a MIOC chip due to temperature change. The hysteresis problem exhibits itself as a slight change in the transmitted power of a FOG instrument as the instrument is first taken through a positive or negative temperature change followed by a negative or positive temperature change. The charge differential that develops across the face of the chip results in a charge leakage across the face of the chip. The time and temperature dependent effects combine to contribute to a slight hysteresis in the transmitted power of the instrument and to the efficiency of the waveguides in the MIOC to propagate light.

As an initial solution, conductive paint or conductive epoxy was applied to the sides of test chips. The adhesive material used was a poor conductor. However, the test demonstrated that instruments which had previously failed due to saturation or hysteresis effects were able to pass an acceptance test when modified. A solution consisting of metallization on the + and −Z surfaces (the sides) of the chip and the use of conductive feet to electrically connect the +Z and −Z surfaces was proposed as a solution for the saturation or arcing effect. The word "feet" will be understood to be the plural of—foot—as used herein.

As further background, Integrated optics chips, such as those characterized in this application are formed using processes and steps similar to some of those found in related U.S. Patents such as U.S. Pat. No. 5,193,136 filed Nov. 26, 1991 for a "PROCESS FOR MAKING MULTIFUNCTION INTEGRATED OPTICS CHIPS HAVING HIGH ELECTRO-OPTIC COEFFICIENTS" which issued to Dr. Chin L. Chang et al on Mar. 9, 1993; U.S. Pat. No. 5,046,808 filed Dec. 18, 1989 for an "INTEGRATED OPTICS CHIP AND METHOD OF CONNECTING OPTICAL FIBER THERETO" which issued to Dr. Chin L. Chang On Sep. 10, 1991; U.S. Pat. No. 5,393,371 filed Jun. 21, 1993 for a "INTEGRATED OPTICS CHIPS AND LASER ABLATION METHODS FOR ATTACHMENT OF OPTICAL FIBERS THERETO FOR $LiNbO_3$ SUBSTRATES" which issued to Dr. Chin L. Chang et al on Feb. 28, 1995; U.S. Pat. No. 5,442,719 for an invention titled "ELECTRO-OPTIC WAVEGUIDES AND PHASE MODULATORS AND METHODS FOR MAKING THEM" which issued to Dr. Chin L. Chang et al on Aug. 15, 1995; and U.S. Pat. No. 4,976,506, filed Feb. 13, 1989 for "METHODS FOR RUGGED ATTACHMENT OF FIBERS TO INTEGRATED OPTICS CHIPS AND PRODUCT THERE OF" which issued to Dr. G. Pavlath on Dec. 11, 1990. This application is being filed contemporaneously with a U.S. patent application Ser. No. 09/124,457, filed Jul. 28, 1998 based on docket number GCD 98-22; for a "Dual Purpose Input Electrode Structure For MIOCs (Multi-Function Integrated Optics Chips)" by Lorrie L. Gampp, Gregory A. Zimmerman, Christine E. Geosling and John P. Rahn.

Each of the foregoing patents have a common assignee, Litton Systems Inc. of Woodland Hills, Calif. Each of the foregoing patents cited herein are incorporated herein by reference for the purpose of providing those skilled in the art with background information on how integrated optics chips or multifunction integrated optics circuits are made.

In addition to the above patents, an early paper titled "Short-and Long-term Stability In Proton Exchanged Lithium Niobate Waveguides" by Janet Lehr Jackel and Catherine E. Rice of AT&T Bell Laboratories, Holmdel, N.J., 07733 appeared in SPIE Vol 460, Processing of Guided Wave Optoelectronic Materials (1984) at page 43.

This application is particularly directed to methods and apparatus for the reduction of errors produced in an integrated optics chip, formed to function as an optical modulator. The errors are produced by temperature changes which cause voltage differences across the surface of chip due to the Pyroelectric Effect.

The field that produces the voltage differences across the surface of the chip is caused by any change in the bulk temperature of the chip. A temperature gradient across the chip is not required to produce a voltage difference due to the pyroelectric effect. The effect is produced when ever the temperature of the chip is changed from one value to another such as from room temperature to 100 degrees fahrenheit.

BRIEF DESCRIPTION OF THE DRAWINGS

FIG. 6 is a schematic top view of a packaged optical chip device;

FIG. 7 is a schematic side sectional view of the packaged optical chip of FIG. 6 taken along line 7—7, the optical chip being seated in adhesive;

FIG. 8a is a schematic plan view of columns of MIOC devices formed on a circular wafer of Lithium Niobate (LiNbO$_3$), horizontal row strips of Lithium Niobate (LiNbO$_3$) being positioned on and bonded to the wafer over the MIOC devices in preparation for dicing via slice lines 78a, 78b;

FIG. 8b shows a slice from the circular wafer of FIG. 8a after slicing the circular wafer along lines 78a and 78b. FIG. 8b also shows section line 9—9;

DESCRIPTION OF THE PREFERRED EMBODIMENT

Figure 1:
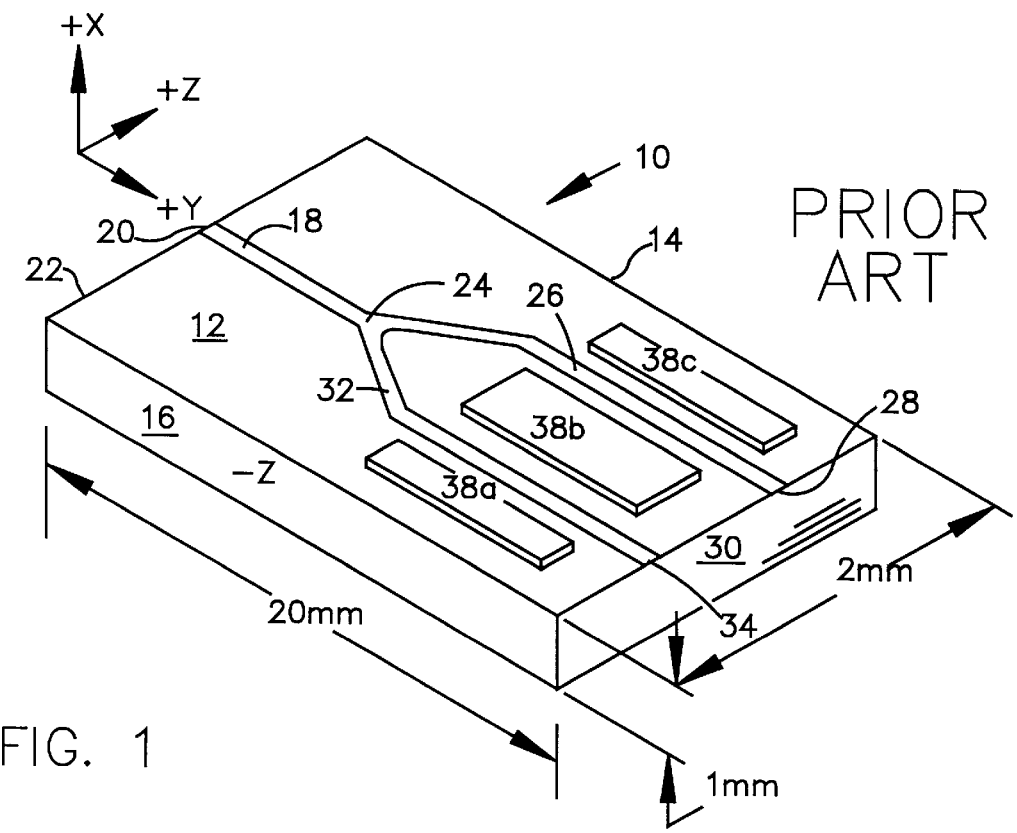
FIG. 1 is a schematic perspective view of a "Y-Coupler and Modulator" showing typical device dimensions.

FIG. 1 provides a schematic perspective view representation of an optics chip 10 formed on a substrate 11 of Lithium Niobate as shown in U.S. Pat. No. 5,442,719 having a top surface 12, orthogonal to a +Z face 14, a −Z face 16 on the opposing side. As shown in the sectional view of FIG. 4, a portion of the +Z and −Z faces 14, 16 are coated at least partially with a conductive coating 15, 17 such as conductive epoxy or metal.

The chip 10 is formed from a crystal having a high electro-optic coefficient, such as Lithium Niobate (LiNbO$_3$). The crystal axes are illustrated showing the +Z crystal axis extending outward from the +Z face, the +X axis extending upward from the top surface 12 and the +Y axis extending to the right along the longitudinal axis. The Z axis is the axis across which a pyroelectric effect is exhibited. A dimension of 20 mm along the Y axis, a width of 2 mm along the Z axis, and a thickness of 1 mm along the X axis are illustrative and are only provided to show what the size might be for a typical optical chip 10.

The optical chip 10 of FIG. 1 combines the functions of a polarizer, a single "Y" spliter and a modulator to form a MIOC (multifunction integrated optic chip) 10 as might be used in a conventional fiber optic gyro. The input waveguide 18 receives light from input port 20 on input face 22. The input waveguide branches at the "Y" junction 24 to a first output waveguide 26 coupled to a first output port 28 on output face 30, and a second output waveguide 32 coupled to a second output port 34 also on the output face 30. The input and output waveguides connect to or comprise a waveguide network which in the present case comprises a "Y" splitter in combination with a phase modulator having modulator plates 38a, 38b and 38c.

Figure 2:
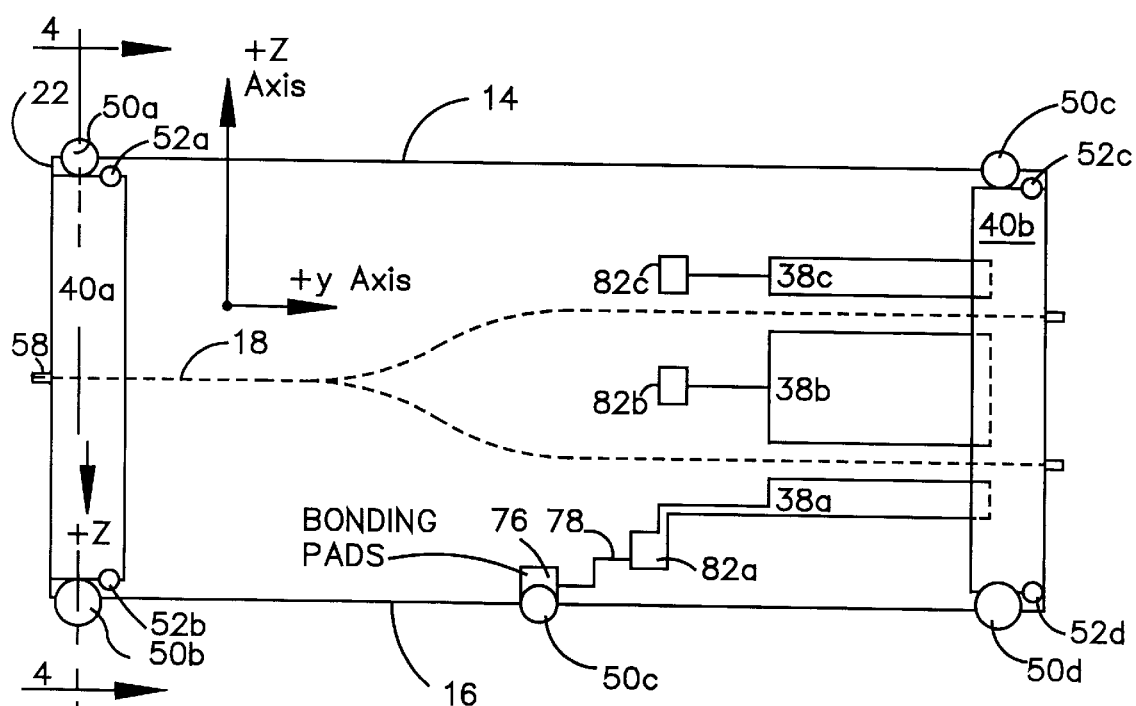
FIG. 2 is a schematic top view of a "Y-Coupler and Modulator" MIOC showing the left side of the left foot being co-planar with the left end of the chip and showing conductive dabs.

FIG. 2, is a schematic top view of the optical chip of FIG. 1. FIG. 2 shows conductive paths 40a and 40b coupling, via conductive security dabs 52a–52d and 50a–50d, the +Z face 14 and −Z face 16 to prevent a charge differential from developing between the +Z and −Z faces. The conductive security dabs 52a–52d and 50a–50d are used to increase reliability of the conductive paths 40a, 40b which might be degraded at the edges by temperature cycling or variations in the quality of metalization applied to the respective feet.

Figure 3:
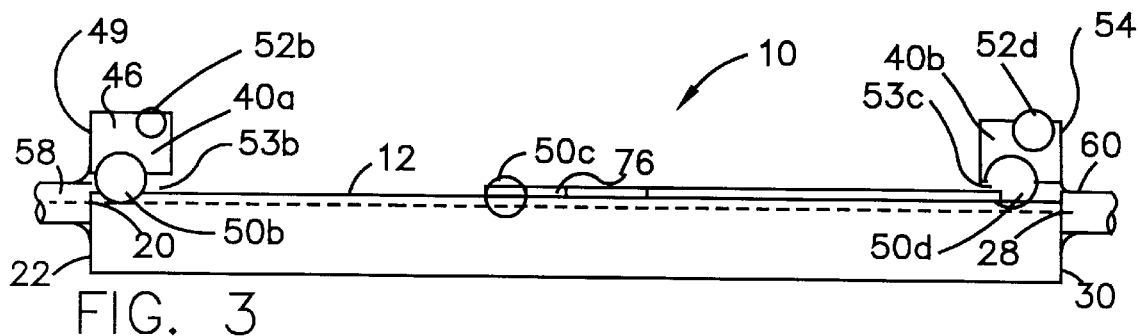
FIG. 3 is a side elevation view of the schematic "Y-Coupler and Modulator" MIOC of FIG. 2.

FIG. 3 is a side elevation of FIG. 2 showing a first foot 46 on the top surface 12 of the optical chip 10. At the left end of the FIG. 3, conductive security dab 50b bridges the gap 53b between the conductive path 40a on the side surface 44b (shown in FIG. 5) of the first foot 46 and the conductive coating 17 on the −Z face 16. At the right end of the FIG. 3, conductive security dab 50d bridges the gap between the conductive path 40b on the side surface and the conductive surface 17 on the −Z face.

Figure 4:
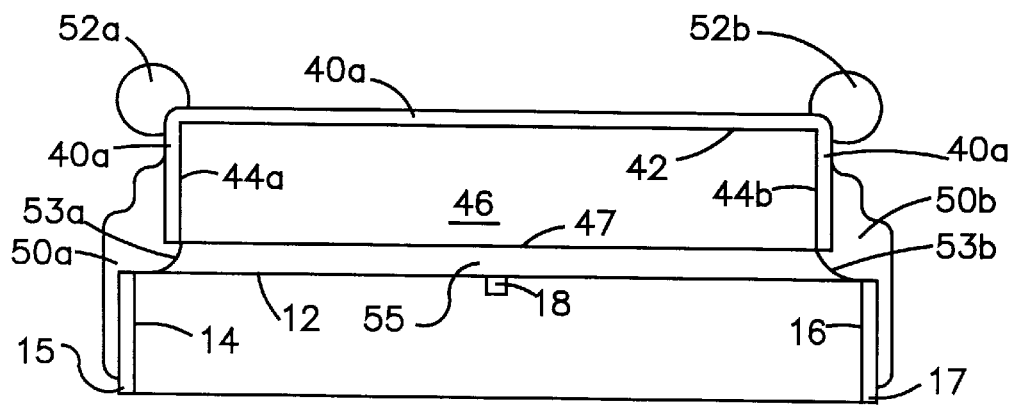
FIG. 4 is a sectional view of the schematic "Y-Coupler and Modulator" MIOC of FIG. 2 taken on line 4—4 of FIG. 2.

FIG. 4 is a sectional of FIG. 3 taken on section line 4—4 of FIG. 2. The conductive paths 40a is formed on the top surface 42 of the first foot 46. The conductive path 40a is shown covering the side surfaces 44a, 44b of the first foot 46. The base face 47 of the first foot 46 is parallel to and under the top surface 42. The base face 47 is bonded to top surface 12 of the optics chip 10 with a suitable bonding material 55.

FIG. 4 shows conducting security dab 50a providing a conductive path from the conductive coating 40a on the left edge of foot 46 to the conductive coating 15 on the +Z face 14. Conductive dab 50b provides a conductive path from the conductive coating 40a on the right side of foot 46 to the conductive coating 17 on the −Z face 16 of the optics chip and bridges the gap 53b between the side surface 44b of the first foot 46 and the conductive coating 17 on the −Z face 16.

The conductive coating 15 on the +Z face and the conductive coating 17 on the −Z face of the optics chip are preferably metal. Referring again to FIG. 3, first foot 46 has butt face 49 aligned to be co-planar with the input face 22 of the optic chip 10. Second foot 54 has butt face 56 aligned to be co-planar with the output face 30 of the optic chip 10.

Figure 5:
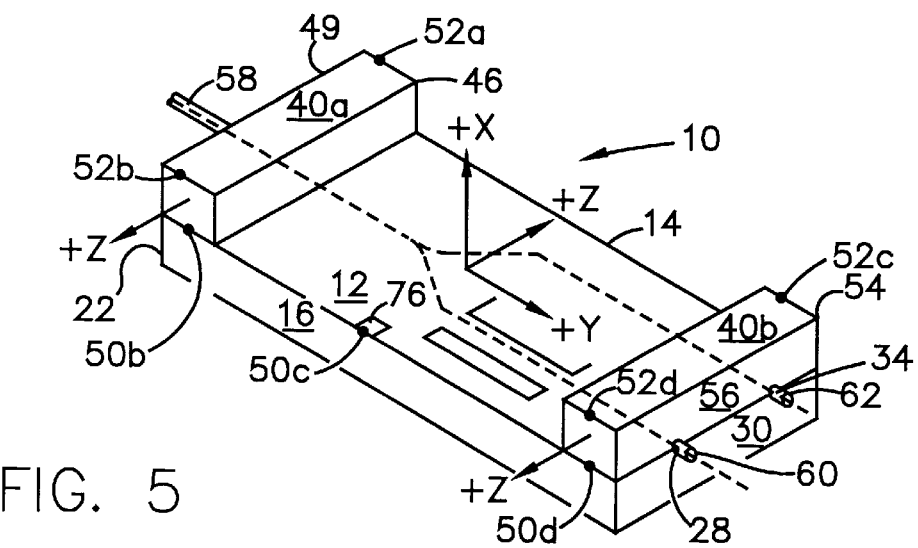
FIG. 5 is a schematic perspective view of the "Y-Coupler and Modulator" MIOC of FIG. 3 showing the direction of the axis of the +Z axis of the feet in relation to the +Z axis of the chip.

FIG. 5 shows the combination of a first foot 46 having its butt face 49 aligned to be co-planar with input face 22 and the corresponding input port 20 (not shown) and second foot 54 with its butt face 56 aligned to be co-planar with the output face 30 and the corresponding waveguide first and second output ports 28, 34. In each case, aligning the first foot butt face 49 or the second foot butt face 56 with a corresponding end of the optic chip 10 provides an extended or expanded surface with the respective input face 22 or output face 30 for bonding a fiber optic pigtail such as pigtails 58, 60, 62 to the respective input or output port such as described in U.S. Pat. No. 4,975,506 to Pavlath reference supra.

In the embodiment of FIG. 5, the conductive coating 40a, 40b on each respective foot and on the +Z face and on the −Z face of the optics chip is preferably metal deposited thereon by vacuum deposition or sputtering. The feet are preferably formed by slicing a wafer of lithium niobate crystal. In the preferred embodiment, each foot is positioned on the optics chip with its respective +Z axis aligned to be opposite in direction to the +Z axis of the optics chip.

FIG. 6 is a top view of a packaged device, typically a hermetically sealed can 66, optical pigtails 58, 60, 62 extending therefrom and electrical contacts 70a, 70b, 70c extending from the sides for driving internal circuitry (not shown) such as the phase modulator 36 electrodes 38a, 38b and 38c (not shown).

FIG. 7 is a side sectional view of FIG. 6 taken on line 7—7 to show the optical chip 10 mounted in sealed can 66. The +Z and −Z faces 14, 16 of the optic chip are coated with a conductive coating such as metal. The base face of the optic chip is bonded by a conductive adhesive 72 to a mounting surface in the protective package 66. The adhesive 72 may form a direct contact with the metalization on the +Z face 14 and the −Z face 16 along a respective lower edge of the optic chip 10. The adhesive is blended to be sufficiently conductive to bleed off a charge between the +Z and −Z faces.

In the foregoing alternative embodiments, metalized feet, conductive dabs and conductive adhesive 72 or conductive epoxy has been proposed as means for conductively connecting the conductive coating on the +Z face to the conductive coating on the −Z face. An electrical lead or a gold flying lead connecting the two faces to each other or to a common terminal is expected to also provide a means for conductively connecting the conductive coating on the +Z face to the conductive coating on the −Z face.

FIGS. 2, 3, 4 and 5 show bonding pad 76 in combination with conductive security dab 50c as an example of a contact pad to which a flying lead can be bonded. A circuit trace 78 is shown in FIG. 2 leads to a modulator plate 38a. Contact pads 82a, 82b, 82c are connected to modulator drive circuitry. Connecting the conductive coatings 15 of the +Z face to the conductive coating 17 on the −Z face and to the modulator circuitry via dab 50c, pad 76 and trace 78 to modulator pad 82a as shown in FIG. 2 prevents the conductive coating from floating and collecting a static charge.

In practice, modulator pads 82a and 82c are connected together and exit the optic chip at a first bonding pad to be driven from a first signal source. A second signal source, out of phase with the first, drives the pad 82b. A second pad is connected to pad 82b. Tests have shown that grounding the conductive coating eliminates a saturation problem.

The process or method for producing an optics chip having a top surface, a +Z face, a −Z face, the optic chip being formed from a crystal having a high electro-optic coefficient and having at least one input face having at least one waveguide input port, comprises the steps of:

1. coating at least a portion of the +Z and −Z faces with a conductive coating,
2. conductively coupling the conductive coating on the +Z face to the conductive coating on the −Z face.

The method is further characterized by coating at least a portion of the +Z and −Z faces with a conductive coating and more particularly by the step of metalizing the +Z face and −Z face using vacuum deposition. The method or process is also enhanced by forming at least one foot of lithium niobate to have a base surface, a first and second side surface and a top surface, and then metalizing the first and second side surface and a top surface of the foot using vacuum deposition. The feet are then positioned and the base surface of the foot is bonded onto the top surface of the optic chip. The surfaces of the foot are metalized forming a conductive bridge from the metalization on the +Z face to the metalization on the −Z face.

Conductive security dabs of conducting adhesive are positioned to conductively couple the metalization on the surfaces of the foot to the metalization on the +Z face and to the metalization on the −Z face. The conductive security dabs insure that continuity will be maintained, even if the metal breaks at the bond line between foot or chip and at the sharp corners of the chip where there may be high stress.

FIG. 8a shows a large number of optical chips on a wafer before the wafer is diced. Foot strips of Lithium Niobate (LiNbO$_3$) 74a, 74b, 74c, 74d are first bonded across the wafer in an array of rows taking care to orientate the +Z axis of each Lithium Niobate (LiNbO$_3$) strip to have the required orientation based on the orientation of the +Z axis of the wafer and the optic chips thereon.

The wafer is then be sliced along paths such as 78a, 78b to separate the wafer into columns of optical chips each having two feet attached to its surface. The optical chips are then masked as strips or after being sliced into individual optical chips to permit the vacuum deposition of metal from a position above the top surface of the optical chip through the mask.

The metal is deposited to cover the top surface of each foot, the sides of the optical chip and feet and to fill in the gap between the side of the foot and the metalized surface of the side of the optical chip.

The preferred conducting layer is vacuum evaporated or sputtered metal of the same type used for the modulator electrodes 38a–38c and pads 76, 82a–82c. A composite layer of first titanium and then gold is sometimes used. Process-wise, the conducting path 40a or strap across the top of the foot could be put on at the wafer level before the wafer is diced into feet as characterized in the following process or method.

Referring to FIG. 8a, a top view of a wafer, two rows of are shown, each chip having a top surface, a +Z face and a −Z face. The chips are formed on the crystal wafer, the crystal material having a high electro-optic coefficient. Each optic chip has at least one input face, and at least one waveguide input port. The method comprises the steps of:

1. forming a plurality of optical chips on a wafer of Lithium Niobate (LiNbO$_3$) using conventional methods;
2. forming foot strips of Lithium Niobate (LiNbO$_3$) 74a–74d with a cross section sized for use in the making of feet;
3. positioning, and bonding the strips in an array of rows across columns of optical chips on the surface of the wafer before dicing the wafer, the +Z axis of the strips being opposite in direction to the +z axis of the optical chips;
4. dicing the columns of optical chips using a diamond saw or other means to form column strips of optical chips as shown in FIG. 8b. The sawed column strips of optical chips having exposed optical chip edges and exposed foot sides in co-planar relation;
5. masking the optical chip column strips to expose the optical chip edges and the foot sides and to shield the top and butt surfaces of the optical chips;
6. metalizing the exposed optical chip edges, the exposed foot sides to form a conductive path or bridge between the exposed edges of the optical chip; and finally
7. dicing the metalized column strips of optical chips to form individual optical chips.

FIG. 8b shows a slice of the wafer. Slicing the wafer after the foot strips 74a–74d are bonded is a process step that eliminates the step between the side of the foot and the surface of the optical chip shown in FIG. 4.

When the feet are mounted individually, the width of each foot (approximately 2 mm) is typically sightly less than the width of the optical chip. The slight difference in width between the foot and the width of the optical chip causes a the step that is shown in an exaggerated manner in FIG. 4.

Figure 9:
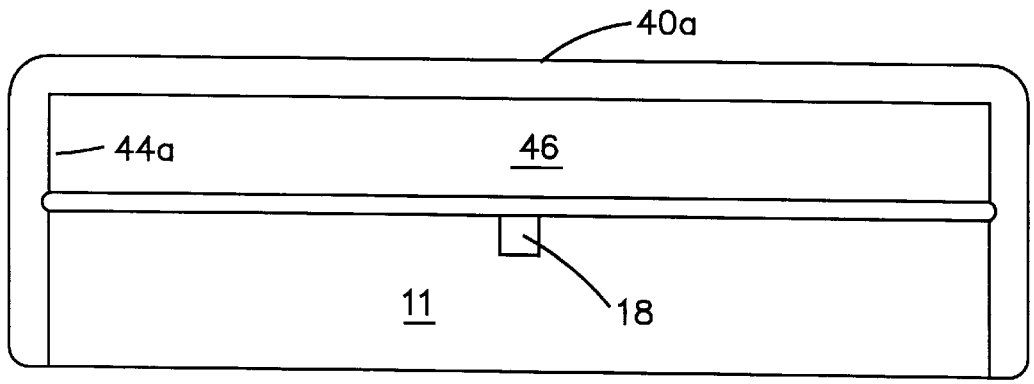
FIG. 9 is a scaled up schematic sectional view of FIG. 8b taken on section line 9—9 after slicing and metalizing the sides of the MIOC strips and the tops of the feet.

FIG. 9, characterizes a sectional view taken along a section line such as 9—9 of FIG. 8b to illustrate how the metalized coating would cover the foot, the sides of the optical chip and bridge the gap between the top of the foot and the sides of the optical chip. If the metalization of the foot and sides of the optical chip is developed to be sufficiently uniform and reliable, use of the conductive security dabs may be eliminated.

Figure 10:
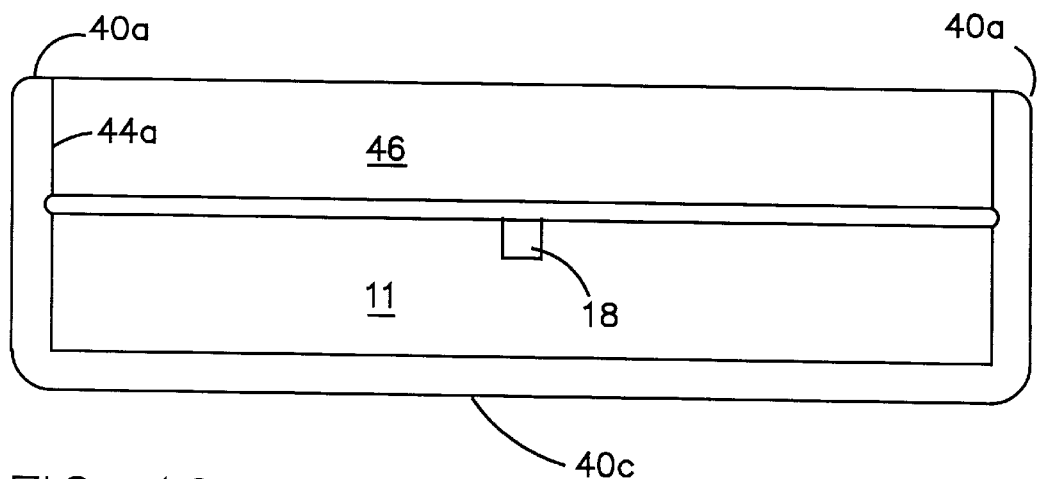
FIG. 10 is a scaled up schematic sectional view of FIG. 8b taken on section line 9—9 after slicing and metalizing the sides and base of the substrate of the MIOC strips.

FIG. 10 depicts an alternative arrangement in which the conductive path 40a across the top of the foot is omitted and a conductive path 40c is placed across the bottom of the substrate 11. The +Z and −Z faces are shorted together by the metalization on the base of substrate 11 without the use of feet.

Each foot is bonded to the top surface of the optical chip using an adhesive such as Norland 83H. The layer of adhesive can be as much as a couple of microns thick. The layer of adhesive may not reach the side of the foot in some instances leaving a slight gap 53a, 53b under the foot. Gaps 53a, 53b are depicted under the left and right edges of the foot in FIG. 4. Putting the foot strips 74a–74d on the wafer before slicing and dicing will produce a more uniform bond line under each individual foot.

Aligning and bonding the LiNbO$_3$ strips to the circular wafer with properly oriented Z axes polarity and then slicing and dicing the circular wafer will produce the optics chips more economically.

The present first choice for the conducting layer is deposited metal by either thermal evaporation or sputtering; however, other coatings can be used such as a high resistivity sputtered palladium-gold and graphite paint.

Although the invention has been disclosed and illustrated in detail, it is to be understood that the same is by way of illustration as an example only and is not to be taken by way of limitation. The spirit and scope of this invention is to be limited only by the terms of the appended claims.

I claim:

1. An Integrated Optics Chip comprising:
   an optics chip having a top surface orthogonal to a +Z face and a −Z face, the chip being a crystal having a high electro-optic coefficient, a +Z crystal axis extending outward from the +Z face, the ±Z axis being that axis across which a pyroelectric effect is exhibited,
   at least a first input waveguide on the top surface coupled to receive an optical signal from an input port, and to couple that signal to a waveguide network,
   at least a first output waveguide on the top surface coupling the waveguide network to an output port,
   a portion of the +Z and −Z faces being coated at least partially with a conductive coating,
   a conductive path coupling the +Z and −Z faces to prevent a charge differential from developing between the +Z and −Z faces.

2. The Integrated Optics Chip of claim 1 further comprising:
   at least a first foot, the first foot having,
      a base face coupled to the top surface of the optics chip, and
      a conductive surface coupled to and providing a conductive path from the conductive coating on the +Z face to the conductive coating on the −Z face of the optics chip.

3. The Integrated Optics Chip of claim 1 wherein the conductive coating on the +Z face and the conductive coating on the −Z face of the optics chip are metalized surfaces.

4. The Integrated Optics Chip of claim 1 further comprising:
   at least a first foot having,
      a base face coupled to the top surface of the optics chip,
      a butt face aligned to be co-planar with at least the input face having the waveguide input port, or aligned to be co-planar with the output face having the waveguide output port of the optics chip, the butt face providing an extended surface with the corresponding input or output face for bonding a fiber optic pigtail to the respective input or output port,
      the foot having a conductive surface coupled to and providing a conductive path from the conductive coating on the +Z face to the conductive coating on the −Z face of the optics chip.

5. The Integrated Optics Chip of claim 1 further comprising:
   at least a first and second foot, each foot having,
      a base face coupled to the top surface of the optics chip,
      at least the first foot having a butt face aligned to be co-planar with the input face having the input port of the optics chip, or the second foot having a respective butt face aligned to be co-planar with the output face having the waveguide output port of the optics chip, the respective butt faces providing an extended surface with the corresponding input or output face for bonding a fiber optic pigtail to the respective input or output port,
      each respective foot having a conductive surface coupled to and providing a conductive path from the conductive coating on the +Z face to the conductive coating on the −Z face of the optics chip.

6. The Integrated Optics Chip of claim 5 wherein each respective foot conductive surface is a metalized surface coupled to and provides a conductive path from the conductive coating on the +Z face to the conductive coating on the −Z face of the optics chip.

7. The Integrated Optics Chip of claim 1 further comprising:
   at least a first foot having,
      a base face coupled to the top surface of the optics chip,
      the foot having a metalized surface coupled to and providing a conductive path from the conductive coating on the +Z face to the conductive coating on the −Z face of the optics chip, and
      a butt face aligned to be co-planar with at least the input face having the waveguide input port, or the output face having the waveguide output port of the optics chip, the butt face providing an extended surface with the corresponding input or output face for bonding a fiber optic pigtail to the respective input or output port.

8. The Integrated Optics Chip of claim 1 further comprising:
   at least a first and second foot, each foot having,
      a base face coupled to the top surface of the optics chip,
      at least the first foot having a butt face aligned to be co-planar with the input face of the optics chip having the waveguide input port of the optics chip, or the second foot having a respective butt face aligned to be co-planar with the output face of the optics chip having the waveguide output port of the optics chip, the respective butt faces providing an extended surface with the corresponding input or output face for bonding a fiber optic pigtail to the respective input or output port,
      each respective foot having a metalized surface coupled to and providing a conductive path from the conductive coating on the +Z face to the conductive coating on the −Z face of the optics chip.

9. The Integrated Optics Chip of claim 1 further comprising:
at least a first and a second foot, each foot having,
a base face coupled to the top surface of the optics chip, the first and second foot being made of lithium niobate crystal,
at least the first foot having a butt face aligned to be co-planar with the input face of the optics chip, or the second foot having a respective butt face aligned to be co-planar with the output face of the optics chip,
each respective foot having a metalized surface coupled to and providing a conductive path from the conductive coating on the +Z face to the conductive coating on the −Z face of the optics chip.

10. The Integrated Optics Chip of claim 1 further comprising:
at least a first and a second foot, each foot having,
a base face coupled to the top surface of the optics chip, the first and second foot being made of lithium niobate crystal, each foot having a +Z axis aligned to be opposite in direction to the +Z axis of the optics chip,
at least the first foot having a butt face aligned to be co-planar with the input face of the optics chip, or the second foot having a respective butt face aligned to be co-planar with the output face of the optics chip,
each respective foot having a metalized surface coupled to and providing a conductive path from the conductive coating on the +Z face to the conductive coating on the −Z face of the optics chip.

11. The Integrated Optics Chip of claim 1 wherein:
the optic chip is made of Lithium Niobate crystal, the +Z axis of the crystal being orientated to extend in a direction substantially normal to the +Z face, at least the +Z and −Z faces of the optic chip being metalized to form a conductive coating and wherein:
at least a first and a second foot, each foot having,
a base face coupled to the top surface of the optics chip,
the first and second foot being made of lithium niobate crystal,
each foot having a respective +Z axis aligned to be opposite in direction to the +Z axis of the optics chip,
at least the first foot having a butt face aligned to be co-planar with the input face of the optics chip, or the second foot having a respective butt face aligned to be co-planar with the output face of the optics chip,
each respective foot having a metalized surface coupled to and providing a conductive path from the conductive coating on the +Z face to the conductive coating on the −Z face of the optics chip, and
at least one conductive dab positioned to provide a conductive path from the +Z face or the −Z face to the metalized surface of the foot.

12. The Integrated Optics Chip of claim 1 wherein:
the optic chip is made of Lithium Niobate crystal, the +Z axis of the crystal being orientated to extend in a direction substantially normal to the +Z face, at least the +Z and −Z faces of the optic chip being metalized to form a conductive coating and further comprising a base face opposing and in parallel relation to the top face, the base face of the chip is bonded by an adhesive to a mounting surface in a protective package, the adhesive forming a direct contact with the metalization on the +Z face and the −Z face along a respective lower edge, the adhesive being characterized to be sufficiently conductive to prevent a charge differential from developing between the +Z and −Z faces.

13. An Integrated Optics Chip comprising:
an optics chip having a top surface, a +Z face, a −Z face, the chip being formed from a crystal having a high electro-optic coefficient,
at least one input face having at least one waveguide input port coupled to a first waveguide of a waveguide network,
at least one output face having at least one waveguide output port coupled to a second waveguide of the waveguide network,
a base surface beneath the top surface, and
means for providing a conductive path to couple the +Z and −Z faces to prevent a charge differential from developing between the +Z and −Z faces.

14. The Integrated Optics Chip of claim 13 wherein the optics chip further comprises:
a +Z crystal axis extending outward from the +Z face, the +Z face, a −Z face having at least a portion coated with a conductive coating, and wherein,
the means for providing a conductive path to couple the +Z and −Z faces to prevent a charge differential from developing between the +Z and −Z faces further comprises:
at least a first foot having,
a base face coupled to the top surface of the optics chip, a conductive surface on the foot, the conductive surface on the foot being coupled to and providing a conductive path from the conductive coating on the +Z face to the conductive coating on the −Z face of the optics chip.

15. The Integrated Optics Chip of claim 13 wherein the +Z face and the −Z face of the optics chip are metalized and wherein the optics chip is further characterized to have
a +Z crystal axis extending outward from the +Z face, and wherein,
the means for providing a conductive path to couple the +Z and −Z faces further comprises:
a mounting surface within a protective package,
a conductive adhesive positioned between the mounting surface and the base surface of the optic chip to form a direct contact between the +Z face and the −Z face, the adhesive being characterized to be sufficiently conductive to prevent a charge differential from developing between the +Z and −Z faces.

16. The Integrated Optics Chip of claim 13 wherein the optics chip further comprises:
a +Z crystal axis extending outward from the +Z face, the +Z face, and the −Z face each having at least a portion of their surface coated with a conductive coating,
the means for providing a conductive path to couple the +Z and −Z faces to prevent a charge differential from developing between the +Z and −Z faces further comprises:
at least a first foot having,
a base face coupled to the top surface of the optics chip,
a conductive surface on the foot, the conductive surface providing a conductive path from the conductive coating on the +Z face to the conductive coating on the −Z face of the optics chip, and
a conductive dab positioned to span a gap between the conductive coating on the +Z face to the conductive surface on the foot.

17. The Integrated Optics Chip of claim 13 wherein the optics chip further comprises:

a +Z crystal axis extending outward from the +Z face, the +Z face, and the −Z face each having at least a portion of their surface coated with a conductive coating, and wherein, the means for providing a conductive path to couple the +Z and −Z faces to prevent a charge differential from developing between the +Z and −Z faces further comprises:

a conductive coating on the +Z and −Z faces, each respective face having a metalization pad suitable for the attachment of a conductive lead, a lead having a first end electrically bonded to the metalization pad on the +Z face and a second end electrically bonded to the metalization pad on the −Z face.

18. A method for producing an optics chip having a top surface, a +Z face, a −Z face, the chip being formed from a crystal having a high electro-optic coefficient and having, at least one input face having at least one waveguide input port, comprising the steps of:

coating at least a portion of the +Z and −Z faces with a conductive coating, conductively coupling the conductive coating on the +Z face to the conductive coating on the −Z face.

19. The method for producing an optics chip of claim 18 wherein the step of coating at least a portion of the +Z and −Z faces with a conductive coating further comprises the step of metalizing the +Z face and −Z face using vacuum deposition, and wherein the step of, conductively coupling the conductive coating on the +Z face to the conductive coating on the −Z face further comprises the steps of:

forming at least one foot of lithium niobate to have a base surface, a first and second side surface and a top surface, metalizing the first and second side surface and a top surface of the foot using vacuum deposition, positioning and bonding the base surface of the foot onto the top surface of the optic chip, the metalization on the surfaces of the foot forming a conductive bridge from the metalization on the +Z face to the metalization on the −Z face, and positioning conductive dabs to conductively couple the metalization on the surfaces of the foot to the metalization on the +Z face and to the metalization on the −Z face.

20. A method for producing an optics chip having a top surface, a +Z face, a −Z face, the chip being formed from a crystal having a high electro-optic coefficient and having, at least one input face having at least one waveguide input port, comprising the steps of:

forming a plurality of optical chips on a wafer of Lithium Niobate ($LiNbO_3$) using conventional methods, forming strips of Lithium Niobate ($LiNbO_3$) with a cross section sized for use in the making of feet, positioning, and bonding the strips in an array of rows across columns of optical chips on the surface of the wafer before dicing the wafer, the +Z axis of the strips being opposite in direction to the +Z axis of the optical chips, dicing the columns of optical chips to form column strips of optical chips, the sawed column strips of optical chips having exposed optical chip edges and exposed foot sides, masking the optical chip column strips to expose the optical chip edges and the foot sides and to shield the top surfaces of the optical chips, metalizing the exposed optical chip edges, the exposed foot sides to form a conductive bridge between the exposed edges of the optical chip, dicing the metalized column strips of optical chips to form individual optical chips.

* * * * *